United States Patent [19]

Scott et al.

[11] Patent Number: 4,577,870

[45] Date of Patent: Mar. 25, 1986

[54] O-RING SEAL IN CHANNEL WITH FLUID PRESSURE EQUALIZATION MEANS

[75] Inventors: Daniel G. Scott, Swissvale; Theodore B. Hill, N. Versailles, both of Pa.

[73] Assignee: American Standard Inc., Wilmerding, Pa.

[21] Appl. No.: 579,311

[22] Filed: Feb. 13, 1984

[51] Int. Cl.⁴ .................. F16J 15/48; F15B 13/042
[52] U.S. Cl. ........................................ 277/1; 277/78;
 277/27; 277/177; 277/176; 137/625.69
[58] Field of Search .................. 277/1, 3, 27, 29, 70,
 277/71, 173, 177, 188 R, 188 A, 50, 180, 77–79,
 186, 38–43, 226, 165, 176, 190; 285/DIG. 19;
 251/DIG. 1; 137/625.69

[56] References Cited

U.S. PATENT DOCUMENTS

| | | | |
|---|---|---|---|
| 2,614,793 | 10/1952 | Storm | 277/177 X |
| 2,652,298 | 9/1953 | Estey | 277/173 |
| 2,892,645 | 6/1959 | Tydeman | 277/78 |
| 3,023,014 | 2/1962 | Donner | 277/78 |
| 3,359,999 | 12/1967 | Mueller | 277/176 X |
| 3,462,159 | 8/1969 | Baumann et al. | 277/27 |
| 3,727,925 | 4/1973 | Jones | 277/176 X |
| 4,034,993 | 7/1977 | Okada et al. | 277/188 A |
| 4,155,557 | 5/1979 | Grebert | 277/27 |
| 4,165,622 | 8/1979 | Brown | 277/173 X |
| 4,277,031 | 7/1981 | Moumaneix et al. | 251/DIG. 1 X |
| 4,418,711 | 12/1983 | Stoll et al. | 251/DIG. 1 X |

FOREIGN PATENT DOCUMENTS

| | | | |
|---|---|---|---|
| 2405176 | 8/1974 | Fed. Rep. of Germany | 277/27 |
| 2747715 | 2/1979 | Fed. Rep. of Germany | 251/DIG. 1 |
| 2929351 | 2/1981 | Fed. Rep. of Germany | 277/71 |
| 1216718 | 11/1959 | France | 251/DIG. 1 |
| 1230025 | 3/1960 | France | 277/71 |
| 826521 | 1/1960 | United Kingdom | 277/177 |
| 983178 | 2/1965 | United Kingdom | 251/DIG. 1 |

Primary Examiner—Robert S. Ward
Attorney, Agent, or Firm—J. O. Ray, Jr.

[57] ABSTRACT

An apparatus to improve the sealing capabilities of a sealing member. The apparatus comprises a first member having a channel formed therein for receiving the sealing member in sealing engagement with the bottom of the channel. A second member forms a second seal with the sealing member. A number of fluid pressure zones are provided in addition to two fluid passageways to communicate fluid on opposed sides of the sealing member. A means is provided on at least one side of the sealing member to communicate a portion of at least one of the fluids communicated into the pressure zones between two of such pressure zones. A method for using the apparatus to improve the sealing capabilities of a sealing member is also disclosed.

44 Claims, 6 Drawing Figures

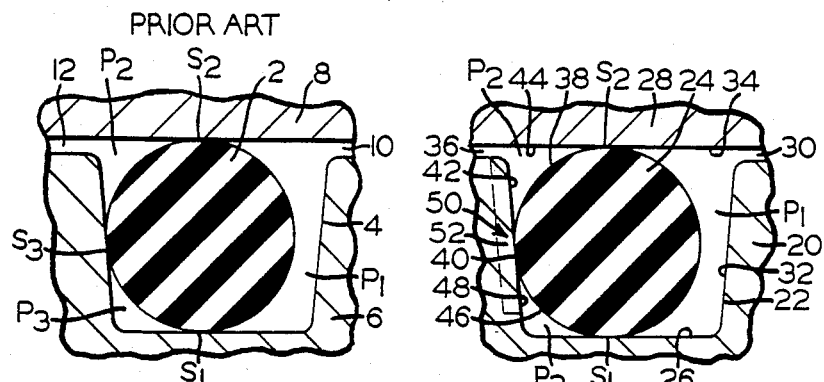
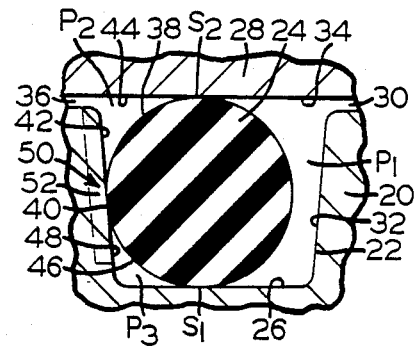
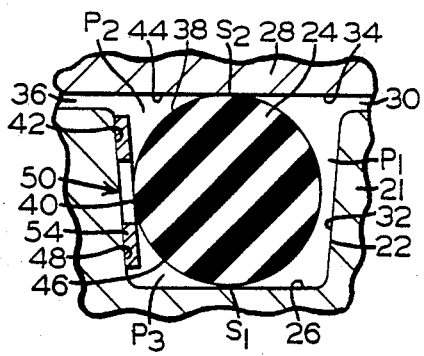
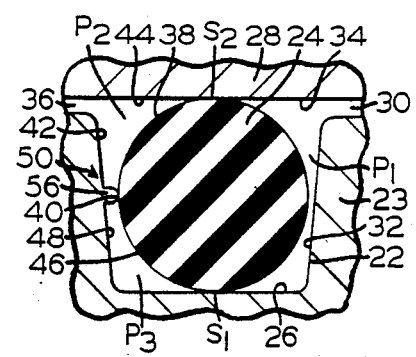
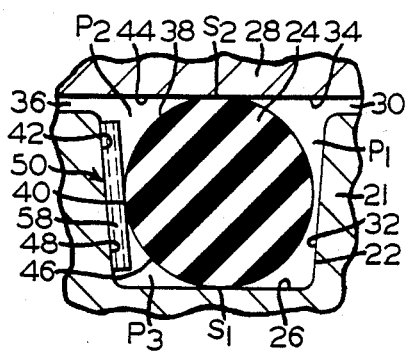
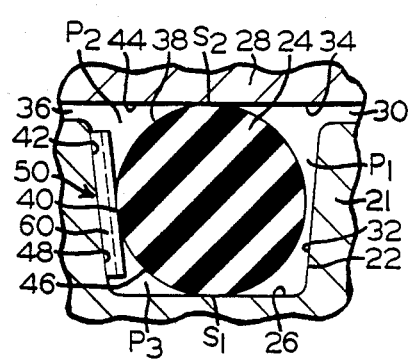

O-RING SEAL IN CHANNEL WITH FLUID PRESSURE EQUALIZATION MEANS

BACKGROUND OF INVENTION

The present invention generally relates to the field of sealing members that are used in industrial fluid flow control applications and, more particularly, the present invention is concerned with an improved method of, and an apparatus for, enhancing the sealing capabilities of sealing members which are to be subjected to predetermined differential pressures on the opposite sides thereof during their normal use in a particular fluid flow control application.

Sealing members in general and, in particular O-ring sealing members, have been known and used in a wide variety of industrial applications for many years. For example, most of the industrial hydraulic control applications, as well as the majority of the pneumatic control applications, use O-rings as a primary sealing means. In addition, a large percentage of these industrial fluid pressure control applications involve the use of a spool valve. This is known to be particularly the case involving a pneumatic control system. Consequently, the leakage of O-ring sealing members that occurs around a spool valve is, and has continued to be, a problem of major concern to the industrial user. It has been felt that the leakage problem was primarily the result of an excessive amount of wear on the O-ring sealing member. It is known that one of the primary causes of such wear on O-ring sealing members is the result of abrasion. One of the major causes of such abrasion occurs when the O-ring sealing member passes the sharp edges of fluid passageways that are drilled in a spool bushing of a spool valve. The leakage of fluid passed an O-ring sealing member may be caused by phenomenon unrelated to the amount of wear that may have occurred to the O-ring sealing member.

SUMMARY OF THE INVENTION

The invention, taught in this specification, provides an improved apparatus for increasing the sealing capabilities of a sealing member in a fluid flow control type application. The invention is particularly well suited for use in an application where the sealing member will be subjected, on opposite sides thereof, to a differential pressure. The apparatus of the instant invention includes, in an elementary form, a first member which has at least one generally U-shaped channel formed therein. The first member has the sealing member, such as an O-ring seal, disposed in the generally U-shaped channel in sealing engagement with the bottom thereof. A second member that is provided is positioned for sealing engagement with the sealing member at a point substantially opposite the bottom of the generally U-shaped channel. The first member and the second member are adapted for relative movement therebetween. In certain applications, the first member may be desirably held stationary with the second member being movable; while in other applications, for whatever reason, the reverse may be the desired mode of operation. A source for a first fluid, having a first pressure, is placed in fluid communication with one side of the sealing member. Also, a source for a second fluid, having a second pressure, is placed in fluid communication with the opposite side of the sealing member. During the normal operation of the sealing member, for most industrial applications, the first pressure will be different than the second pressure. A means is provided on the interior of the generally U-shaped channel on the side of the sealing member that will normally be subjected to a pressure after the first pressure has been applied to the opposite side of the sealing member. This means is provided for substantially equalizing the pressure over the side surface of the sealing member on which the means is provided. The fact that this pressure is substantially equalized significantly enhances the sealing capabilities of the sealing member.

Also disclosed in the specification is a method of improving the sealing characteristics of a sealing member that can be used to advantage in a fluid flow control application in which the sealing member will be subjected to a differential pressure across opposing sides thereof. Like the apparatus, the method disclosed is useful in both hydraulic control applications and pneumatic control applications.

To practice the method, according to the teachings of the invention, a pair of pressure seals are established substantially on the opposed sides of the sealing member. Thereafter, a first fluid, which is at a predetermined pressure, is communicated to a first pressure zone on a first side of the sealing member. The first fluid, communicated into the first pressure zone, moves the sealing member into sealing engagement at a third point, thereby establishing a third seal. When the third seal is established, a second pressure zone and a third pressure zone are also established opposite the first pressure zone. Then a second fluid is communicated at a predetermined pressure into the second pressure zone. At the same time, the second fluid is being communicated to the second pressure zone, fluid communication with a portion of the second fluid must also be established between the second pressure zone and the third pressure zone to equalize the pressure therebetween. The pressure in the first pressure zone can then be lowered to a pressure below the pressure of the second fluid being communicated to the second pressure zone and the third pressure zone by a requisite amount depending on the application. The enhanced sealing characteristics of the sealing member are now observed by following the method of the invention because the lower pressure in the first pressure zone will not be overcome by the higher pressure second fluid being communicated to the second pressure zone. This is true because the pressures in the second pressure zone and the third pressure zone have been equalized by establishment of fluid communication therebetween.

OBJECTS OF THE INVENTION

It is, therefore, the principle object of this invention to provide a method of, and an apparatus for, enhancing the sealing capabilities of a sealing member that will be subjected to a pressure differential on opposite sides thereof, which substantially equalizes the pressure on the low pressure side of the sealing member.

Another object of the invention is to provide a method of, and an apparatus for, equalizing the predetermined pressures on at least one side of a sealing member that can be used in a fluid flow control application with equal effectiveness during use on either a hydraulic control system or on a pneumatic control system.

Yet another object of the invention is to provide a method of, and an apparatus for, equalizing the pressure on at least the low pressure side of a sealing member that is economical.

Still another object of the invention is to provide a method of, and an apparatus for, equalizing the pressure on at least one side of a sealing member that will be operable over a wide variety of operating conditions.

Yet still another object of the invention is to provide a method of, and an apparatus for, enhancing the sealing characteristics of a sealing member, such as an O-ring seal, that is subjected to pressure differentials which will be somewhat insensitive to minor dimensional variations of the O-ring sealing member.

A further object of the invention is to provide a method of, and an apparatus for, enhancing the sealing characteristics of a sealing member, such as an O-ring seal, that is subjected to pressure differentials, wherein the method of and apparatus for equalizing the predetermined pressure on the low pressure side of the O-ring seal may be easily varied according to the pressure differential to be encountered during use.

A still further object of the invention is to provide a method of, and an apparatus for, enhancing the sealing characteristics of an O-ring sealing member that is subjected to differential pressure that is effective over a variety of sealing members.

It will be understood that these and various other objects and advantages of the invention will become more apparent to those persons skilled in the art from the following detailed description when taken in conjunction with the attached drawings.

BRIEF DESCRIPTION OF THE DRAWINGS

FIG. 1 is a fragmented view in cross-section of prior art that shows an O-ring sealing member seated in a generally U-shaped channel of a spool valve;

FIG. 2 is a fragmented view in cross-section of a presently preferred embodiment that shows an O-ring sealing member seated in a generally U-shaped channel of a spool valve, which incorporates therein a groove cut in the generally U-shaped channel for equalizing the predetermined pressure on that side of the O-ring sealing member adjacent the groove;

FIG. 3 is a fragmented view in cross-section of an alternative embodiment of the invention, which shows an O-ring sealing member seated in a generally U-shaped channel of a spool valve and having incorporated therein a split washer between one side of the generally U-shaped channel and the O-ring sealing member for equalizing the predetermined pressure on that side of the O-ring sealing member in intimate contact with the split washer;

FIG. 4 is a fragmented view in cross-section of another alternative embodiment of the invention, which shows an O-ring sealing member seated in a generally U-shaped channel of a spool valve and has incorporated therein at least one protuberance on one side of the generally U-shaped channel for intimate contact with the O-ring sealing member, so that the predetermined pressure on that side of the O-ring sealing member in intimate contact with the protuberance will be equalized;

FIG. 5 is a fragmented view in cross section of still another alternative embodiment of the invention, which shows an O-ring sealing member seated in a generally U-shaped channel of a spool valve and has incorporated therein a tube between one side of the generally U-shaped channel and the O-ring sealing member, which will allow equalization of the predetermined pressure on that side of the O-ring sealing member that is in intimate contact with the tube; and FIG. 6 is a fragmented view in cross-section of yet another alternative embodiment of the invention, which shows an O-ring sealing member seated in a generally U-shaped channel of a spool valve and has incorporated therein an inverted channel between one side of the generally U-shaped channel and the O-ring sealing member, for equalizing the pressure on that side of the O-ring sealing member which is in intimate contact with the inverted channel.

DESCRIPTION OF PRESENTLY PREFERRED EMBODIMENTS

For a precise understanding of the advantages and significance of this invention, reference is made to FIG. 1, Prior Art, for a detailed explanation of the cause of leakage that occurs around sealing members, such as O-ring sealing members. As seen in FIG. 1 of the drawings, an O-ring sealing member 2 is seated in a more or less generally U-shaped channel 4 of a first member 6, such as, for example, a spool valve. The O-ring sealing member 2 is placed into intimate sealing contact with the bottom surface of the generally U-shaped channel 4 at a point which forms a seal $S_1$. In addition, the O-ring sealing member 2 is placed into intimate sealing engagement with a second member 8, such as, for example, a spool bushing at a point which forms another seal $S_2$. In this case, both of the seals designated $S_1$ and $S_2$ are of importance and are desirable, because these are the seals that establish the required pressure seals between the opposite sides of the O-ring sealing member 2.

A first fluid passageway 10 is provided on one side of the O-ring sealing member 2. The capacity for fluid flow through the first fluid passage 10 can be controlled by the size of the O-ring sealing member 2, because the first fluid passageway 10 is formed by the O-ring sealing member 2 creating a gap between the first member 6 and the second member 8. When the first fluid, which has a predetermined pressure, is communicated from a first fluid pressure source (not shown) through the first fluid passageway 10 into a first fluid pressure zone $P_1$, such pressure is applied initially to one side of the O-ring sealing member 2 adjacent the first fluid pressure zone $P_1$. With the application of the initial predetermined amount of pressure to the side of the O-ring sealing member 2, the O-ring sealing member 2 is moved into a position of sealing engagement against the side of the generally U-shaped channel 4 opposite the first fluid pressure zone designated $P_1$.

This forced movement of the O-ring sealing member 2 into sealing engagement against the side of the generally U-shaped channel 4 establishes a totally undesirable third seal $S_3$. The reasons why the third seal $S_3$ is highly detrimental and contributes to significant leakage around an O-ring sealing member 2 will become clear as the description proceeds. The formation of the third seal $S_3$ establishes a second fluid pressure zone $P_2$ that is located between the second seal $S_2$ and the third seal $S_3$. The formation of the third seal $S_3$ additionally establishes a highly detrimental third fluid pressure zone $P_3$ that is located between the first seal $S_1$ and the third seal $S_3$.

A second fluid passageway 12 is provided on the side of the O-ring sealing member 2 which is opposite the first fluid passageway 10. The volumetric capacity for fluid flow through the second fluid passageway 12 can also be controlled by the size of the O-ring sealing member 2. The second fluid passageway 12 provides fluid communication of a second fluid from a second fluid supply source (not shown) to the second fluid pressure zone $P_2$. The second fluid is also provided at a predetermined pressure.

It will now become apparent to those skilled in the art that the third seal $S_3$ and the third fluid pressure zone $P_3$ are detrimental and contribute to significant leakage of fluid around the O-ring sealing member 2. When the second fluid is communicated through the second fluid passageway 12 into the second fluid pressure zone $P_2$, the second fluid pressure is effective only in the second fluid pressure zone $P_2$, because the third seal $S_3$ now prevents any fluid pressure acting on the third fluid pressure zone $P_3$. Consequently, the third fluid pressure zone $P_3$, located between the third seal $S_3$ and the first seal $S_1$, is isolated. For this reason, the third fluid pressure zone $P_3$ remains at a relatively lower pressure than the first fluid pressure zone $P_1$ and the second fluid pressure zone $P_2$. This condition leads to considerable leakage of fluid around the seal $S_2$ of the O-ring sealing member 2 during use.

Under the operating conditions, as set forth in the above description, it is readily clear that when a fluid pressure reduction occurs in the first fluid pressure zone $P_1$, for whatever reason, then the fluid pressure in the second fluid pressure zone $P_2$ becomes greater than the reduced pressure in the first fluid pressure zone $P_1$. One situation in which this condition occurs, for example, is in a railway braking system. It is at this particular time, during the operation of the fluid flow control system, when both of these pressures will far exceed the relatively low pressure trapped in the third fluid pressure zone $P_3$. It is these relative pressures which exert a tremendous amount of force on the sealing member in the direction of the third fluid pressure zone $P_3$. In practice, the resulting force described causes the O-ring sealing member 2 to be forced away from sealing engagement at the second seal $S_2$. Consequently, a considerable amount of leakage is observed flowing passed the O-ring sealing member 2 from the now higher pressure second fluid pressure zone $P_2$ into the now reduced pressure first pressure zone $P_1$.

Throughout the remaining several views of the drawings, like numerals will be used to designate identical parts; and for a clearer understanding of the invention, like symbols will be used in the remaining views as they were used with reference to the description of FIG. 1 above. A top view of an annular sealing member, such as an O-ring, has not been shown because it is not necessary for an understanding of the invention by those persons skilled in the sealing member art.

Now reference is directed to FIG. 2 for a showing of what is presently considered to be the preferred embodiment of the invention. The embodiment of FIG. 2 would be easier to fabricate, have the lowest cost, and even more importantly, would reduce maintenance during its life. Although the invention will be described, as it would relate to a pneumatic fluid flow control valve used in a railway braking application; for ease of understanding, it should be understood that it is in no way limiting because the principles of the invention are applicable to a number of quite different applications including both hydraulic and pneumatic. The invention is most useful, however, in a fluid flow control system in which the sealing member will be subjected to differential pressures on opposite sides thereof.

The apparatus for enhancing the sealing capabilities of a sealing member comprises a first member 20, which in this case is a spool valve, having a more or less generally U-shaped annular channel 22 formed thereon. Disposed within the generally U-shaped channel 22 is a sealing member 24. Although the sealing member 24 will be described hereinafter as an O-ring sealing member, it should be understood that the principles of the invention can also apply to other shaped sealing members that are used in industry for differential pressure sealing applications. The sealing member 24 is deformable. The O-ring sealing member 24 is placed into sealing engagement with the bottom surface 26 of the generally U-shaped channel 22 to form a first seal $S_1$. A second member 28 is positioned for sealing engagement with the O-ring sealing member 24 to form a second seal $S_2$. As the invention is being described with respect to a pneumatic fluid flow control valve, the second member 28 could be a spool bushing. In actual practice, the first member 20 and the second member 28 may move relative to one another and it is not important to the principle of the invention to function as to which moves and which is stationary or if movement occurs at all. The movement, if any, will preferably be along a longitudinal axis; but in some particular application, it may also be desirable to have the relative movement be in a rotational direction.

The apparatus, constructed according to the invention, will also include a first fluid passageway 30 on one side of the O-ring sealing member 24. The first fluid passageway 30 provides communication of a first fluid, having a first predetermined pressure, from a first fluid supply source (not shown) into a first fluid pressure zone $P_1$ adjacent a first side of the O-ring sealing member 24. The perimeter of the first fluid pressure zone is bounded by a first side of the O-ring sealing member 24 located between the seals $S_1$ and $S_2$, a portion of the bottom surface 26 of the generally U-shaped channel 22 located between the seal $S_1$ and the first fluid passageway 30 side, the wall 32 of the generally U-shaped channel 22 and a portion 34 of the wall of the second member 28 located between the seal $S_2$ and the first fluid passageway 30 entry aperture into the first fluid pressure zone $P_1$.

A second fluid passageway 36 is also provided. The second fluid passageway 36 provides fluid communication of a second fluid, having a second predetermined pressure, from a second fluid supply source (not shown) into a second fluid pressure zone $P_2$ adjacent a first portion 38 on a second side of the O-ring sealing member 24 opposite the first side thereof. The perimeter of the second fluid pressure zone $P_2$ is bounded by the first portion 38 on the second side of the O-ring sealing member 24 located between the seal $S_2$ and a point 40 on the wall of the generally U-shaped channel 22 opposite of wall 32, a first portion 42 of the wall of the generally U-shaped channel 22 located between the entry aperture of the second fluid passageway 36 and the point 40, and a portion 44 of the wall of the second member 28 located between the seal $S_2$ and the second fluid passageway 36 entry aperture into the second fluid pressure zone $P_2$. The point 40, as used in this specification, is where the sealing member 24 will contact a wall of the channel 22 and form an undesirable seal (similar to $S_3$ in FIG. 1). The third fluid pressure zone $P_3$ is bounded by a second portion 46 of the second side of the O-ring sealing member 24 located between the seal $S_1$ and the point 40 on the wall of the generally U-shaped channel 22, a second portion 48 of the wall of the generally U-shaped channel 22 located between the point 40 on the wall and the bottom surface 26 of the generally U-shaped channel, and that portion of the bottom surface 26 of the generally U-shaped channel 22 located between the seal $S_1$ and the second portion 48 of the wall. From the above description, those skilled in the art recognize that, because the O-ring sealing member 24 is moved to the left in FIG. 2, the higher pressure is being exerted on the O-ring sealing member 24 in the first fluid pressure zone $P_1$. It should be further apparent that a mirror image would occur should a higher pressure be exerted on the opposite side of the O-ring sealing member 24. In such a case, the point 40 would be on the right-hand side wall 32 of FIG. 2, and the old first fluid pressure zone $P_1$ would form new second and third fluid pressure zones $P_2$ and $P_3$. Likewise in this case, the old second and third fluid pressure zones $P_2$ and $P_3$ would form a new first fluid pressure zone $P_1$ on the left-hand side of FIG. 2. In at least one application described herein, the high and low pressure sides alternate.

The apparatus, thus far described, is essentially the same for both the presently preferred embodiment and the alternative embodiments.

In accordance with what is the presently preferred embodiment of the invention, the apparatus further comprises a means, generally designated 50, for substantially equalizing the pressure on the low pressure side which, in the example being used, it is the pressure of the second fluid between the second pressure zone $P_2$ and the third pressure zone $P_3$ on the second side of the O-ring sealing member 24. The means, generally designated 50, is positioned between the second side of the O-ring sealing member 24 and the wall of the generally U-shaped channel 22 adjacent the second side of such O-ring sealing member. The means, generally designated 50, is also positioned to provide fluid communication of the second fluid between the second pressure zone $P_2$ and the third pressure zone $P_3$. Because, in some applications, the O-ring sealing member 24 will have alternating high pressure on opposite sides thereof, it may, in those cases, be desirable to provide a mirror image of the fluid communication means, generally designated 50, on the side wall 32 of the generally U-shaped channel 22 as well. Such mirror image has not been shown in the various Figures since it would be obvious to those skilled in the art how to provide such means on opposite sides. For example, the perimeter of the old first fluid pressure zone that would correspond to pressure zone $P_3$ would be bounded on the side adjacent the bottom surface 26 by a first side of the O-ring sealing member 24 located between the seal $S_1$ and the contact point (not shown) between the sealing member 24 and the side wall 32 of the generally U-shaped channel 22, a portion of the bottom surface 26 of the generally U-shaped channel 22 located between the seal $S_1$ and the fluid passageway 30 side, and the lower portion of the wall 32 of the generally U-shaped channel 22. Further, the contact point which is not shown would be the mirror image of the contact point 40 shown on the left-hand side. The perimeter of the first fluid pressure zone $P_1$ that would correspond to pressure zone $P_2$ would be bounded on the side adjacent the first fluid passageway 30 by a portion 34 of the wall of the second member 28 located between the seal $S_2$ and the first fluid passageway 30 entry aperture into the first fluid pressure zone $P_1$, the upper portion of the wall 32 between the contact point (not shown) and the entry aperture of first fluid passageway 30 and by the portion of the sealing member 24 positioned between the seal $S_2$ and the contact point (not shown) of sealing member 24 with the wall 32. The new high pressure side would be bounded by the first portion 38 on the second side of the O-ring sealing member 24 located between the seal $S_2$ and a point 40 on the wall of the generally U-shaped channel 22 opposite of wall 32, a first portion 42 of the wall of the generally U-shaped channel 22 located between the entry aperture of the second fluid passageway 36 and the point 40, and a portion 44 of the wall of the second member 28 located between the seal $S_2$ and the second fluid passageway 36 entry aperture into the second fluid pressure zone $P_2$, the second portion 46 of the second side of the O-ring sealing member 24 located between the seal $S_1$ and the point 40 on the wall of the generally U-shaped channel 22, the second portion 48 of the wall of the generally U-shaped channel 22 located between the point 40 on the wall and the bottom surface 26 of the generally U-shaped channel, and that portion of the bottom surface 26 of the generally U-shaped channel 22 located between the seal $S_1$ and the second portion 48 of the wall. Therefore, the means, generally designated 50, in one elementary form is a fluid communication passageway 52. In the embodiment shown in FIG. 2, the fluid communication passageway 52 comprises a radial groove that is scribed on the surface of the wall adjacent the second low pressure side of the O-ring sealing member 24.

For simplicity of understanding the principle of how the invention functions, it should be remembered that the description pertains to its use in a pneumatic fluid flow control application such as, for example only, a railway braking control valve, and is not limited thereto.

In the operation of the embodiment, shown in FIG. 2, a first fluid pressure seal $S_1$ is established between the deformable elastomeric O-ring sealing member 24 and the bottom surface 26 of the generally U-shaped channel 22. A second fluid pressure seal $S_2$ is then established between the O-ring sealing member 24 and the second member 28. After having established seals $S_1$ and $S_2$, a first fluid is communicated into a first fluid pressure zone $P_1$ through a first fluid passageway 30 from a first fluid pressure source. The first fluid is communicated to the first pressure zone $P_1$ at a first predetermined pressure. The first pressure will normally be maintained in the first fluid pressure zone $P_1$ for a predetermined length of time. In the application being described, this predetermined time is the period of elapsed time between rake applications. Also in the application, as it relates to a pneumatic fluid flow control application of a railway braking system, the first fluid predetermined pressure will substantially be in the range of between about 1 psi and about 110 psi. About the same time the first fluid pressure is communicated into the first fluid pressure zone $P_1$, the first fluid pressure will cause the sealing member 24 to move laterally to the point 40 on the wall of the generally U-shaped channel 22 opposite the first fluid pressure zone $P_1$. The point 40, on the wall of the generally U-shaped channel 22, forms the juncture of the second fluid pressure zone $P_2$ and the third fluid pressure zone $P_3$.

At this time, a second fluid pressure may be communicated into the second fluid pressure zone $P_2$ through a second fluid passageway 36 from a second fluid pressure source. With proper piping and valving arrangements, as is understood by those skilled in the art, a single common source may be provided for both the first fluid pressure and the second fluid pressure. The second fluid is also communicated to the second pressure zone $P_2$ at a second predetermined pressure. As with the first fluid pressure, the second fluid pressure is maintained for a predetermined length of time. The second fluid predetermined pressure is substantially in the range of between about 1 psi and about 110 psi. At the time the second fluid is communicated to the second fluid pressure zone $P_2$, a portion of the fluid will be communicated into the third fluid pressure zone through the passageway 52. The amount of fluid communicated into the third pressure zone $P_3$ will be an amount sufficient to equalize the pressure on the O-ring sealing member 24 adjacent both the second fluid pressure zone $P_2$ and the third fluid pressure zone $P_3$.

It is now possible to reduce the fluid pressure in the first fluid pressure zone $P_1$ without leakage of fluid occurring passed the O-ring sealing member 24 at the seal $S_2$. Such a reduction of pressure being required in the present application of the method when a rake application is necessary. During a brake application, the fluid pressure may be lowered by a predetermined amount substantially in the range of between about 110 psi and about 0.5 psi. It should also, at this point, be understood by those skilled in the art, that if the particular application for the principles of this invention to apply, require a sufficient fluid pressure drop in the first fluid pressure zone $P_1$ to cause the O-ring sealing member to move laterally into sealing contact with the wall of the generally U-shaped channel 22, adjacent the first side of such O-ring sealing member 24, then a second means (not shown) but the same as the means, generally designated 50, may be used on that side also. In this case, fluid communication must be established to the O-ring sealing member 24 on the first side of the first fluid pressure zone $P_1$ around the point in an amount that will be sufficient to equalize the pressure on the sealing member adjacent that side.

The method of improving the sealing capabilities, as just described, applies in the same manner to all of the alternative embodiments of the apparatus to be hereinafter described.

Now refer to FIG. 3 for an understanding of a first alternative embodiment of the invention. As shown in this Figure, the means, generally designated 50, is positioned adjacent the wall portion 42 and the wall portion 48 of first member 21 to provide fluid communication between the second fluid pressure zone $P_2$ and the third fluid pressure zone $P_3$ to equalize the fluid pressure on the O-ring sealing member 24 adjacent both the second fluid pressure zone $P_2$ and the third fluid pressure zone $P_3$.

Another alternative embodiment is shown in FIG. 4 in which the means, generally designated 50, positioned adjacent the wall portion 42 and the wall portion 48 of the first member 23 to provide fluid communication between the second fluid pressure zone $P_2$ and the third fluid pressure zone $P_3$, is at least one protuberance 56. Preferably two protuberances 56 are used, and if only one is used, it must be of a size to prevent intimate sealing contact of the O-ring sealing member 24 and the wall of the generally U-shaped channel 22 at the juncture of the second fluid pressure zone $P_2$ and the third fluid pressure zone $P_3$.

Now refer to FIG. 5 of the drawings for an understanding of still another alternative embodiment of the invention. As depicted in this Figure, the means, generally designated 50, positioned adjacent the wall portion 42 and the wall portion 48 of the first member 21 to provide fluid communication of the second fluid between the second fluid pressure zone $P_2$ and the third fluid pressure zone $P_3$, is a piece of tubing 58.

A further alternative embodiment of the invention is shown in FIG. 6. As shown, the means, generally designated 50, positioned adjacent the wall portion 42 and the wall portion 48 of the first member 21 for providing fluid communication of the second fluid from the second fluid pressure zone $P_2$ into the third fluid pressure zone $P_3$, is an inverted channel 60.

It should also be noted that it is possible to provide a fluid communication passageway on the sealing member as well.

As can now be readily understood from the above description of the presently preferred and various alternative embodiments, the invention provides a low-cost, essentially maintenance-free method of, and apparatus for, improving the sealing capabilities of a sealing member in a fluid flow control system in which the sealing member will be subjected to a differential pressure on each side thereof during use in its intended application.

It should also be readily understood by those persons possessing skill in the art that other modifications and adaptations can be made both to the method of, and apparatus for, improving the sealing capabilities of a sealing member without departing from the spirit and scope of the attached claims, which form the only limitations on the invention.

1. A sealing apparatus to maintain fluid sealing between members in a fluid flow control application in which the sealing member is subjected to an application of a differential pressure on opposite sides thereof, said sealing apparatus comprising:
   (a) a first member having at least one generally U-shaped channel formed in said first member;
   (b) a deformable O-ring sealing member positioned at least partially within said U-shaped channel in sealing contact with a point on the bottom surface of said U-shaped channel to form a first seal between said first member and said O-ring sealing member, said first seal being maintained throughout an application of pressure on aaid O-ring sealing member;
   (c) a second member positioned to have sealing contact with said O-ring sealing member to form a second seal between said second member and said O-ring sealing member at a point on said O-ring sealing member substantially diametrically opposite said first seal, said second seal being maintained throughout such application of pressure on said O-ring sealing member to allow a differential pressure on opposite sides of said O-ring sealing member located between said maintained first seal and said maintained second seal;
   (d) said maintained first seal and said maintained second seal preventing fluid leakage from one side of said O-ring sealing member to the opposite side of said O-ring sealing member;
   (e) said deformable O-ring sealing member having a cross-section such that at least one point on said cross-section which is intermediate said first seal and said second seal and is on the low pressure side of said O-ring sealing member is closely adjacent one side wall of said U-shaped channel and wherein contact of said at least one point with said U-shaped channel side wall establishes at least two pressure zones on said low pressure side of said O-ring sealing member; and (f) a fluid communication means for providing fluid communication between said at least two pressure zones, said fluid communication means positioned adjacent said side wall of said U-shaped channel and said at least one point whereby said fluid communication between said at least two presusre zones will substantially equalize the pressure on said low pressure side of said O-ring sealing member between said substantially diametrically oppositely maintained first seal and second seal.

2. A sealing apparatus, according to claim 1, wherein said means to provide said fluid communication between said at least two pressure zones to substantially equalize said pressure on said O-ring sealing member on said low pressure side between said at least two pressure zones is a first fluid communication passageway.

3. A sealing apparatus, according to claim 2, wherein said first fluid comnunication passageway is a groove scribed on said side wall of said U-shaped channel adjacent said at least one point.

4. An improved sealing apparatus, according to claim 1, wherein said first member and said second member move relative to each other.

5. An improved sealing apparatus, according to claim 4, wherein said relative movement between said first member and said second member is an axial direction.

6. A sealing apparatus, according to claim 4, wherein said fluid flow control application is pneumatic.

7. A sealing apparatus, according to claim 6, wherein said fluid flow control application is a fluid flow control valve.

8. A sealing apparatus, according to claim 7, wherein said fluid flow control valve is a spool valve.

9. A sealing apparatus, according to claim 8, wherein said first member is a spool valve member and said second member is a spool bushing.

10. A sealing apparatus, according to claim 2, wherein said sealing apparatus further comprises a second fluid communication passageway positioned on the side wall of said U-shaped channel diametrically opposite said first fluid communication passageway so that said O-ring sealing member may be subjected to alternating high and low pressure on each side of said O-ring sealing member.

11. A sealing apparatus, according to claim 10, wherein said second fluid communication passageway is a groove scribed on said side wall of said U-shaped channel.

12. A sealing apparatus, according to claim 2, wherein said fluid flow control application is hydraulic.

13. A sealing apparatus, according to claim 10, wherein said first fluid communication passageway and said second fluid communication passageway are substantially identical.

14. A sealing apparatus, according to claim 13, wherein said first fluid communication passageway and said second fluid communication passageway are grooves scribed on said walls of said side generally U-shaped channel.

15. A method of improving the sealing capabilities of an O-ring sealing member subjected to a differential pressure on opposite sides thereof, said method comprising the steps of:

(a) establishing a first pressure seal between a point on the bottom surface of a generally U-shaped channel formed in a first member and said O-ring sealing member;

(b) establishing a second pressure seal between a point on said O-ring sealing member substantially diametrically opposite said first pressure seal and a second member;

(c) maintaining said first and said second seals established in steps (a) and (b) throughout application of pressure on said O-ring sealing member;

(d) imposing a first fluid pressure on a first side of said O-ring sealing member between said first and said second pressure seals;

(e) shifting said O-ring sealing member with said first fluid pressure to thereby establish a first contact point between a second side of said O-ring sealing member intermediate said first and said second pressure seals and a side wall of said generally U-shaped channel; and (f) establishing fluid communication of a second fluid around said first contact point on said O-ring sealing member through a fluid communication passageway formed in said side wall of said generally U-shaped channel in an amount sufficient to substantially equalize the pressure on the surface of said second side of said O-ring sealing member while simultaneously maintaining said first and said second seals established in steps (a) and (b).

16. A method of improving the sealing capabilities of an O-ring sealing member, according to claim 15, further comprising the (a) maintaining said first fluid at a first predetermined pressure on said first side of said O-ring sealing member for a first predetermined time; and (b) lowering said first predetermined pressure of said first fluid by a second predetermined pressure.

17. A method of improving the sealing capabilities of an O-ring sealing member, according to claim 16, further comprising the additional step of maintaining said second fluid at a third predetermined pressure on said second side of said sealing member for a second predetermined time.

18. A method of improving the sealing capabilites of a sealing member, according to claim 17, wherein said first predetermined pressure of said first fluid is substantially in the range of between about 1 psi to about 110 psi.

19. A method of improving the sealing capabilities of an O-ring sealing member, according to claim 18, wherein said third predetermined pressure of said second fluid is substantially in the range of between about 1 psi to about 110 psi.

20. A method of improving the sealing capabilities of an O-ring sealing member, according to claim 19, wherein said fluid flow control application is a railway braking system and said fluid is pneumatic.

21. A method to improve the sealing capabilities of an O-ring sealing member, according to claim 20, wherein said first predetermined time and an O-ring second predetermined time are the length of time between brake applications.

22. A method to improve the sealing capabilities of an O-ring sealing member, according to claim 21, wherein said second predetermined pressure is substantially in the range of between about 110 psi and about 0.5 psi.

23. A method of improving the sealing capabilities of an O-ring sealing member, according to claim 22, further comprising the steps of:

(a) shifting said O-ring sealing member with said third predetermined pressure from said second fluid after said first predetermined pressure of said first fluid has been lowered on said first side of said O-ring sealing member to thereby establish a second contact point between said first side of said O-ring sealing member and the opposite side wall of said generally U-shaped channel;

(b) maintaining said first seal and said second seal while shifting said O-ring sealing member; and (c) establishing fluid communication to said O-ring sealing member on said first side of said first fluid around said second contact point on said O-ring sealing member through a second fluid communication passageway formed in a side wall of said generally U-shaped channel opposite said first contact point in an amount sufficient to equalize the pressure on said sealing member adjacent said first side thereby maintaining said first seal and said second seal.

24. A sealing apparatus to maintain fluid sealing between members in a fluid flow control application in which the sealing member is subjected to an application of a differential pressure on opposite sides thereof, said sealing apparatus comprising:

(a) a first member having at least one generally U-shaped channel formed in said first member;

(b) a deformable sealing member positioned at least partially within said U-shaped channel in sealing contact with the bottom surface of said U-shaped channel to form a first seal between said first member and said sealing member, said first seal being maintained throughout an application of pressure on said sealing member;

(c) a second member positioned to have sealing contact with said sealing member to form a second seal between said second member and said sealing member at a point on said sealing member substantially opposite said first seal, said second seal being maintained throughout such application of pressure on said sealing member to allow a differential pressure on opposite sides of said sealing member located between said maintained first seal and said maintained second seal;

(d) said maintained first seal and said maintained second seal preventing fluid leakage from one side of said sealing member to the opposite side of said sealing member;

(e) said deformable sealing member having a cross-section section such that at least one point on said cross-section on the low pressure side of said sealing member is closely adjacent one side wall of said U-shaped channel and wherein contact of said at least one point with said U-shaped channel side wall establishes at least two pressure zones on said low pressure side of said sealing member; and (f) a fluid communication means for providing fluid communication between said at least two pressure zones, said fluid communication means positioned on said side wall of said U-shaped channel and adjacent said at least one point whereby said fluid communication between said at least two pressure zones will substantially equalize the pressure of said sealing member between said substantially oppositely maintained first seal and second seal.

25. A sealing apparatus, according to claim 24, wherein said means to provide said fluid communication between said at least two pressure zones to substantially equalize said pressure between said at least two pressure zones is a first fluid communication passageway.

26. A sealing apparatus, according to claim 24, wherein said sealing member is an O-ring.

27. A sealing apparatus, according to claim 26, wherein said apparatus further comprises a second fluid communication means positioned on the side wall of said U-shaped channel diametrically opposite said first fluid communication means so that said sealing member may be subjected to alternating high and low pressure on each side of said sealing member.

28. A sealing apparatus to maintain fluid sealing between members in a fluid flow control application in which the sealing member is subjected to an application of a differential pressure on opposite sides thereof, said sealing apparatus comprising:

(a) a first member having at least one generally U-shaped channel formed in said first member;

(b) a deformable sealing member positioned at least partially within said U-shaped channel in sealing contact with the bottom surface of said U-shaped channel to form a first seal between said first member and said sealing member, said first seal being maintained throughout an application of pressure on said sealing member;

(c) a second member positioned to have sealing contact with said sealing member to form a second seal between said second member and said sealing member at a point on said sealing member substantially diametrically opposite said first seal, said second seal being maintained throughout such application of pressure on said sealing member to allow a differential pressure on opposite sides of said sealing member located between said maintained first seal and said maintained second seal;

(d) said maintained first seal and said maintained second seal preventing fluid leakage from one side of said sealing member to the opposite side of said sealing member;

(e) said deformable sealing member having a cross-section such that at least one point on said cross-section on the low pressure side of said sealing member is closely adjacent one side wall of said U-shaped channel and wherein contact of said at least one point with said U-shaped channel side wall establishes at least two pressure zones on said low pressure side of said sealing member; and (f) a fluid communication groove scribed on said side wall for providing fluid communication between said at least two pressure zones, said groove positioned adjacent said at least one point whereby said fluid communication between said at least two pressure zones will substantially equalize the pressure on said sealing member between said substantially diametrically oppositely maintained first seal and second seal.

29. A sealing apparatus, according to claim 28, wherein said first member and said second member move relative to each other.

30. A sealing apparatus, according to claim 29, wherein said relative movement between said first member and said second member is in an axial direction.

31. A sealing apparatus, according to claim 29, wherein said fluid flow control application is pneumatic.

32. A sealing apparatus, according to claim 31, wherein said fluid flow control application is a fluid flow control valve.

33. A sealing apparatus, according to claim 33, wherein said fluid flow control valve is a spool valve.

34. A sealing apparatus, according to claim 33, wherein said first member is a spool valve member and said second member is a spool bushing.

35. A sealing apparatus, according to claim 34, wherein said sealing member is an O-ring.

36. A sealing apparatus, according to claim 35, wherein said apparatus further comprises a second fluid communication groove scribed on the side wall of said U-shaped channel diametrically opposite said first fluid communication groove so that said O-ring sealing member may be subjected to alternating high and low pressure on each side of said O-ring sealing member.

37. A sealing apparatus, according to claim 1, wherein said fluid communication means is formed by a split washer positioned on said side wall of said generally U-shaped channel.

38. A sealing apparatus, according to claim 37, wherein said apparatus further comprises a second fluid communication means formed by a second split washer positioned on a respective adjacent side wall of said generally U-shaped channel diametrically opposite said first split washer fluid communication means so that said sealing member may be subjected to an alternating high and low pressure on each side thereof.

39. A sealing apparatus, according to claim 1, wherein said fluid communication means is formed by an at least one protuberance positioned on said side wall of said generally U-shaped channel and which is of a size at least sufficient to prevent intimate sealing contact of said sealing member with said side wall of said generally U-shaped channel between said at least two pressure zones.

40. A sealing apparatus, according to claim 39, wherein said appartus further comprises a second fluid communication means formed by a second at least one protuberance positioned on a respective adjacent side wall of said generally U-shaped channel diametrically opposite said first at least one protuberance fluid communication means, said second at least one protuberance having a size which is at least sufficient to prevent intimate sealing contact of said sealing member with said respective adjacent side wall of said generally U-shaped channel so that said sealing member may be subjected to an alternating high and low pressure on each side thereof.

41. A sealing apparatus, according to claim 1, wherein said fluid communication means is formed by a piece of tubing positioned on said side wall of said generally U-shaped channel.

42. A sealing apparatus, according to claim 41, wherein said apparatus further comprises a second fluid communication means formed by a second piece of tubing positioned on a respective adjacent side wall of said generally U-shaped channel diametrically opposite said first piece of tubing fluid communication means so that said sealing member may be subjected to an alternating high and low pressure on opposite sides thereof.

43. A sealing apparatus, according to claim 1, wherein said fluid communication means is formed by a piece of channel positioned on said side wall of said generally U-shaped channel.

44. A sealing apparatus, according to claim 43, wherein said apparatus further comprises a second fluid communication means formed by a second piece of channel positioned on a respective adjacent side wall of said generally U-shaped channel so that said sealing may be subjected to an alternating high and low pressure on each side thereof.

* * * * *

UNITED STATES PATENT AND TRADEMARK OFFICE
CERTIFICATE OF CORRECTION

PATENT NO. : 4,577,870
DATED : March 25, 1986
INVENTOR(S) : Daniel G. Scott et al It is certified that error appears in the above-identified patent and that said Letters Patent are hereby corrected as shown below:

Column 10, line 42, change "aaid" to --said

Column 11, line 6, change "presusre" to --pressure-- line 18, change "comunication" to --communication-- line 21, delete "An improved" and insert --A-- line 24, delete "An improved" and insert --A-- line 59, before "walls", insert --side-- same line, after "said", second occurrence, delete "side"

Column 12, line 28, after "the", insert --additional steps of:-- line 41, delete "a" and insert --an O-ring-- line 56, delete "an O-ring" and insert --said--

UNITED STATES PATENT AND TRADEMARK OFFICE
CERTIFICATE OF CORRECTION

PATENT NO. : 4,577,870

DATED : March 25, 1986

INVENTOR(S) : Daniel G. Scott et al

It is certified that error appears in the above-identified patent and that said Letters Patent is hereby corrected as shown below:

Column 14, line 67, delete "33" and insert --32--.

Signed and Sealed this

Fifteenth Day of July 1986

[SEAL]

Attest:

Attesting Officer

DONALD J. QUIGG

Commissioner of Patents and Trademarks